United States Patent [19]
Rudd et al.

[11] Patent Number: 4,748,657

[45] Date of Patent: May 31, 1988

[54] HANDSET ACTUATED SIGNAL INTERCEPT

[75] Inventors: Will Rudd, Perris; Dennis McCullough, Orange, both of Calif.

[73] Assignee: Willard Rudd, Perris, Calif.

[21] Appl. No.: 865,759

[22] Filed: May 22, 1986

[51] Int. Cl.[4] .............................................. H04M 3/22
[52] U.S. Cl. .................................... 379/189; 379/191; 379/200
[58] Field of Search ............... 379/189, 190, 191, 192, 379/193, 281, 282, 283, 257, 284, 399

[56] References Cited

U.S. PATENT DOCUMENTS 3,961,141 6/1976 Ma ...................................... 379/281

Primary Examiner—James L. Dwyer
Attorney, Agent, or Firm—Charles H. Thomas

[57] ABSTRACT

A handset actuated signal intercept circuit is located in a telephone central office and connected to the tip and ring leads of a telephone subscriber line. The signal intercept is operated from central office subscriber line power, but draws so small a current that it is undetectable in normal telephone usage. When a subscriber handset is lifted, the signal intercept detects dial tone and initiates a timing interval of predetermined duration. If no dialing pulses or tones are detected during this interval, the central office channel and trunk which are seized by the initiation of dial tone, are then freed for use on other subscriber lines. Alternatively, if the subscriber line is not authorized for use with touch-tone equipment, the appearance of selected touchpad tones on the subscriber line during the predetermined interval following the initiation of dial tone will activate a gate, which produces an alternating current short across the tip and ring leads of the subscriber line, and prevents further touchpad tones from getting out from the subscriber line.

14 Claims, 2 Drawing Sheets

HANDSET ACTUATED SIGNAL INTERCEPT

BACKGROUND OF THE INVENTION

1. Field of the Invention

The present invention relates to accessory equipment for use on telephone subscriber lines that appear in a telephone central office.

2. Description of the Prior Art

In the operation of commercial telephone systems, subscriber lines are all connected from the different buildings where the subscribers are located to a central testing and access location, termed a telephone central office. At the telephone central office, subscriber lines are terminated and are connected to channels and trunks whenever a call is initiated or received on a subscriber line. The interconnection of the subscriber line with other equipment to complete a telephone call requires the appearance of certain signals on two leads, termed the tip and ring leads, of the subscriber line.

When the subscriber handset is in an idle or "on-hook" condition, a direct current voltage is continuously applied to the tip and ring leads of the telephone subscriber line. This central office subscriber line power is typically applied at a voltage level of about 48 volts, although subscriber line voltages may typically vary between about 48 and about 52 volts, d.c. When a subscriber lifts the receiver of his telephone handset, the voltage level of the central office subscriber line power on that subscriber's line drops sharply, thus initiating seizure of an outgoing channel and trunk in a telephone central office. The seizure of a channel and trunk is necessary for a telephone call to be completed from the subscriber line.

When a telephone subscriber lifts the receiver to an "off-hook" condition, dial tone is produced and a central office channel and trunk are seized. However, not infrequently a subscriber will, for various reasons, never complete a call but simply leave the receiver in an "off-hook" condition. When this occurs, a central office channel and trunk remain connected to that subscriber line until the "off-hook" condition is ultimately terminated.

Studies of subscriber usage have shown that typically no more than about 10% to 20% of subscriber lines that terminate at a telephone central office are in use at any one time. Accordingly, the number of channels and trunks installed at the telephone central office is selected and determined based upon this usage factor.

In recent years, there has been an ever increasing tendency for subscribers to leave their telephone receivers in an "off-hook" condition. This has resulted in an excessive demand for central office channels and trunks. Accordingly, it has been necessary to expend inordinately large amounts of money to install additional trunks and channels in central offices, even though some of these channels and trunks are merely seized and held by telephone subscriber lines which are left in an "off-hook" condition.

Another problem which occurs not infrequently in connection with serving telephone subscriber lines is the problem of unauthorized usage of a subscriber line for a service which the subscriber has declined to accept and for which the subscriber is not charged. Specifically, a subscriber is charged a different rate for the provision of a telephone subscriber line for use with touch-tone, push-button handsets, as contrasted with use of the subscriber line only for the earlier rotary dial or pulse coded type telephone handsets. Nevertheless, even though the customer is paying only for the lower grade service, some subscribers connect telephone touch-tone, push-button handsets to telephone subscriber lines which are only authorized for use with rotary dial telephones. Accordingly, the telphone company is deprived of revenue to which it is rightfully entitled, and the general population of telephone subscribers suffers as a result.

SUMMARY OF THE INVENTION

In one broad aspect the present invention is an electronic circuit for releasing a channel and trunk in a telephone central office which is coupled to the tip and ring leads of a telephone subscriber line, and which is powered by central office subscriber line current. The electronic circuit of the invention includes dial tone detector means which senses the commencement of dial tone on the subscriber line and produces an actuating signal responsive thereto. The dial tone detector means also senses an interruption of dial tone and produces a disabling signal responsive thereto. A timer means is provided which is responsive to the actuating signal to produce a gate enabling signal. A gating means is responsive to termination of the gating signal to open at least one of the tip and ring leads upon the termination of the gating signal. The gating signal is disabled by the disabling signal.

With a line release network circuit of this type, a telephone central office channel and trunk, which are seized by the generation of dial tone in response to a telephone receiver of a handset on the subscriber line going "off-hook", are released if the receiver is simply left in the "off-hook" condition. The timer means determines the time interval within which some interruption in the dial tone must occur to prevent the central office channel and trunk from being released. Typically, this interval may be established at about 15 seconds. A 15 second interval gives the subcriber adequate time to press or dial the first digit of the number with which he wishes to establish communication. Nevertheless, the 15 second interval is short enough so that central office channels and trunks are not tied up for an excessively long time by a telephone handset which has been left in the "off-hook" condition.

In another broad aspect the invention may be considered to be a tone trap circuit for connection across the tip and ring leads of a telephone subscriber line in a telephone central office. The tone trap is powered by subscriber line current and includes a dial tone detection circuit, a timing circuit, a tone sensitive circuit, and gating means. The dial tone detection circuit produces an actuating signal output and is connected across the tip and ring leads. The timing circuit receives the actuating signal output and produces an enabling signal responsive thereto for a predetermined duration. The tone sensitive circuit is coupled across the tip and ring leads and operates when enabled by the enabling signal. The tone sensitive circuit responds to at least one predetermined tone from a push button pad on a telephone handset on the subscriber line to produce a gating signal. The gating means is responsive to the gating signal to produce an alternating current short circuit across the tip and ring leads.

While the invention may be used for different applications, the basic principle remains the same in all applications. That is, the electronic circuit of the invention is connected to the tip and ring leads of a subscriber line and is powered by the existing central office current which is applied to all telephone subscriber lines.

A very important feature of the invention is that only a minimal current is drawn from the central office subscriber line power. Subscriber lines must be tested for proper operation by voltage and current measurements taken at the central office to measure voltage and current on the telephone subscriber lines. The electronic circuit of the invention draws only a very tiny current of no greater than about 4.0 milliamperes. This current drain is so insignificant that normal central office testing and troubleshooting procedures on telephone subscriber lines will not be affected by the presence of the circuit of the invention on a subscriber line.

In accordance with all aspects of the invention, a dial tone detection circuit is coupled to the tip and ring leads of a subscriber line and a timing circuit generates an enabling signal which lasts a predetermined time after the detection of dial tone by the tone detecting circuit. The enabling circuit may be utilized for different applications, such as disconnecting a central office channel and trunk or enabling a circuit which is sensitive to the tones produced by particular numbers on a push-button telephone handset touchpad.

In the line release network according to the invention, the gating means drops the voltage of the central office line current to the ring lead of the subscriber line upon termination of the enabling signal. The line release network also includes disabling means coupled to the tip and ring leads and actuated by the timer to detect an interruption of dial tone so as to disable the gating means responsive to an interruption of dial tone. The gating means drops the central office subscriber line voltage to the ring lead sufficiently to release any central office channel and trunk connected thereto. However, the gating means continues to maintain sufficient voltage on the ring lead so that the dial tone detection circuit is able to detect an "on-hook" condition on the subscriber line. That is, when the gating means is actuated, it drops the voltage of the central office line power on the subscriber line to which it is connected from the normal 48 to 52 volt negative d.c. level to a level of about 9 volts. This voltage level is sufficient so that when the receiver at the remote end of the subscriber line is returned to an "on hook" condition, the resultant voltage drop can be detected as idle line.

The line release network of the invention preferably includes a blocking means which is actuated by termination of the enabling signal to block incoming calls from being connected to the subscriber line after the central office channel and trunk seized by the subscriber line upon the initiation of dial tone have been released. Without the blocking means an incoming call to the subscriber line would be routed directly to that line, even though the subscriber line is in an "off-hook" condition.

Preferably, the dial tone detection circuit, the timer circuit, the gating means and the disabling means draw only about 3.4 milliamperes in an idle condition, and no greater than about 3.9 milliamperes in an active condition.

The line release network of the invention may be used on any line circuit in step-by-step dial systems, crossbar systems, electronic switching systems, digital main switching, central office and PBX systems. The dial tone detection circuit may be tuned for precision dial tone, which typically is provided at a frequency of 350 and 440 hertz. The dial tone detection circuit may be tuned for other frequencies in specially designed systems.

The timer is typically set to produce an enabling signal for a period of either 14 or 15 seconds. To incoming calls to a subscriber line which has been released, the subscriber line appears as an open line. That is, any caller will receive an unanswered ringing signal in calling a subscriber line which has timed out in an "off-hook" condition. Thus, the caller is not charged for completion of a telephone call to that subscriber line. If desired, the system may be modified so that a busy tone is returned to incoming calls directed to a subscriber line which is off-hook.

In the tone trap of the invention, the dial tone detection circuit, the timing circuit, the tone sensitive circuit and the gating means, in the aggragate draw only about 3.4 milliamperes when in an idle state, and only about 3.9 milliamperes when in an active state. As in the line release network, the dial tone detection circuit of the tone trap circuit produces an actuating signal in response to a tone of about 350 hertz. The dial tone detection circuit also preferably includes a phase lock loop circuit to stablize the frequency of dial tone thereto.

In the tone trap circuit the tone sensitive circuit preferably responds to a frequency of 770 hertz. This frequency is one of the frequencies produced in depressing the numbers "4", "5" and "6" on a telephone handset push-button pad. Thus, most telephone calls out from a subscriber line which is authorized to use only rotary dial type, and not touch-tone equipment, will in all likelihood be intercepted, since most telephone numbers in a typical seven digit sequence will include at least one of the digits "4", "5", or "6". Nevertheless, the subscriber will always be able to use touch-tone equipment in emergencies. That is, the subscriber may dial "911" using an unauthorized handset with a touch-tone pad without actuating the intercept system of the invention. Likewise, dialing an "0" for an operator will also not result in an intercept. Thus, even a subscriber utilizing unauthorized touch-tone equipment will not be prevented from dialing emergency numbers.

The invention may be described with greater clarity and particularity by reference to the accompanying drawings.

DESCRIPTION OF THE EMBODIMENTS

Figure 1:
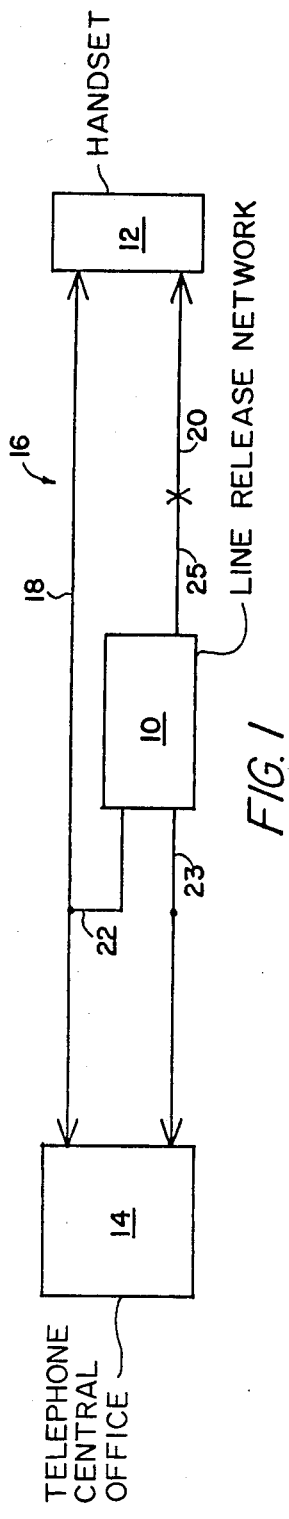
FIG. 1 is a block diagram illustrating the connection of a line release network according to the invention to a telephone subscriber line.

FIG. 1 illustrates a line release network 10 connected to a telephone subscriber line 16 which extends between a telephone subscriber handset 12 and a telephone central office 14. In actuality the line release network 10 is preferably physically located on the premises of the telephone central office 14 where it is connected to the subscriber line 16. The subscriber line 16 includes a tip lead 18 and a ring lead 20. The line release network 10 is connected in circuit with the ring lead 20. That is, the ring lead 20 is physically severed and the line release network 10 is interposed between the segments of the ring lead 20 by means of leads 23 and 25. A bridging connection 22 is connected from the tip lead 18 to the line release network 10.

Figure 2:
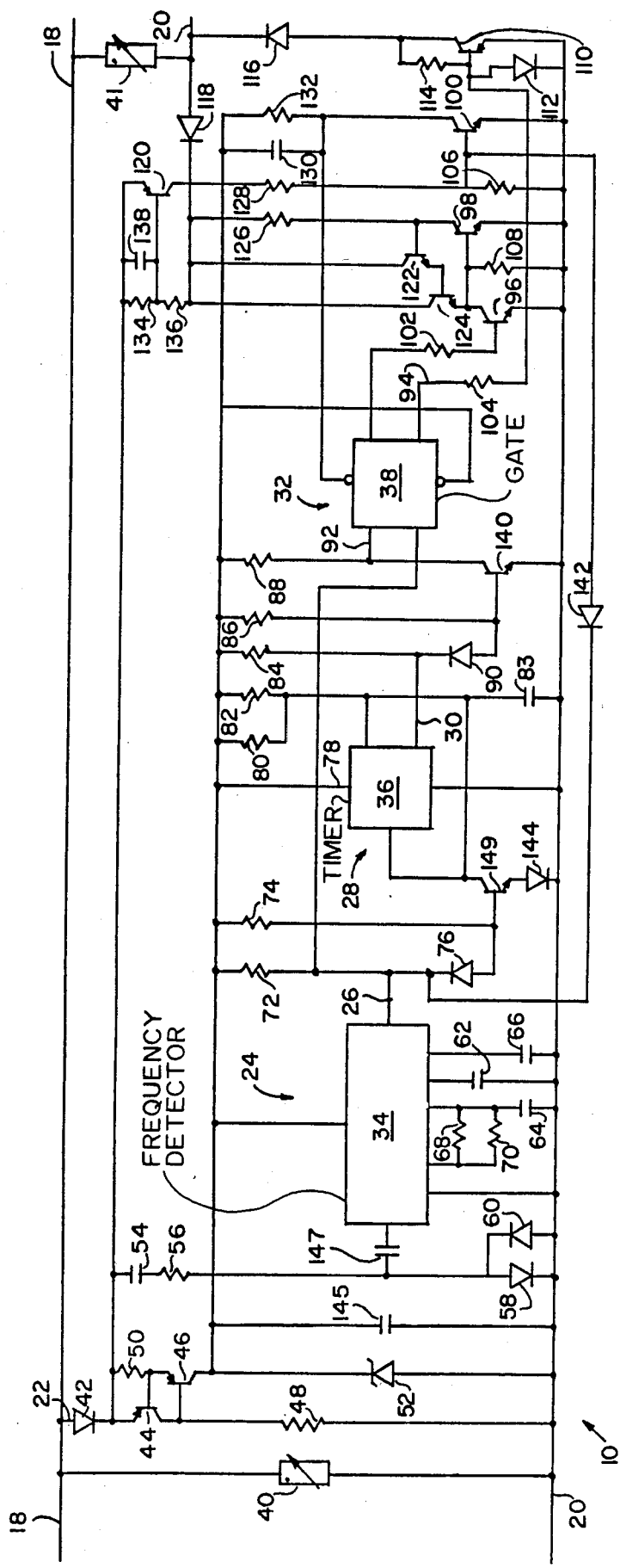
FIG. 2 is a schematic diagram of the line release network of FIG. 1.

The line release network 10 is illustrated in schematic detail in FIG. 2. The line release network 10 is powered by the central office subscriber line current that is carried on the tip and ring leads 18 and 20. The line release network 10 includes a dial tone detection circuit, indicated generally at 24, which responds to dial tone on the tip and ring leads 18 and 20 by producing an actuating signal on line 26. A timer circuit, indicated generally at 28, responds to the actuating signal from line 26 to produce an enabling signal on line 30 of a predetermined duration, for example 15 seconds. A gating means or circuit, indicated generally at 32, is coupled to receive the enabling signal from the timer circuit 28 and is responsive thereto to drop the voltage of the central office subscriber line current to the ring lead 20 of the subscriber line 16 upon termination of the enabling signal on line 30 from the timer circuit 28. The gating circuit 32 drops the voltage of the central office subscriber line current to the ring lead 20 of the subscriber line 16.

The line release network 10 also includes a disabling means. The disabling function is performed by portions of the dial tone detection circuit 24. The disabling means of the dial tone detection circuit 24 is actuated by the timer circuit 28 and disables the gating means 32 responsive to an interruption of dial tone on the subscriber line 16. The gating means 32 drops the central office subscriber line voltage, of approximately 48 or 50 volts, d.c. sufficiently to release any central office channel and trunk seized by the subscriber line 16. The gating means 32 also maintains sufficient voltage, for example a voltage level of about 9 volts d.c., on the ring lead 20 so the dial tone detection circuit 24 is able to detect an "on-hook" condition on the subscriber line when the "off-hook" condition is ultimately terminated.

The principal circuit component of the dial tone detection circuit 24 is an XRL567 IC tunable oscillator chip 34 which can be tuned to a desired frequency. The principal IC component of the timer circuit 28 is an XRL555 IC timing chip 36. The principal component of the gating circuit 32 is a 74HC74 IC flip flop chip 38. Suitable embodiments of all of these chips can be obtained from Exar Manufacturing Co. located in Sunnyvale, Calif.

The line release network 10 includes transient suppressors 40 and 41 which are connected across the tip and ring leads 18 and 20 to suppress transient voltage surges of voltage spikes up to 1000 volts. Other circuit protection elements of the line release network 10 include reverse voltage protection transistors 116 and 118, a polarity guard diode 42, current regulating transistors 44 and 46, current regulating resistors 48 and 50, and a voltage regulating zener diode 52. Coupling capacitors 54 and 147, an input filtering capacitor 145, and a current limiting resistor 56 are connected to the frequency detection IC chip 34 and to voltage clamping diodes 58 and 60. Timing capacitors 62 and 64, output filtering capacitor 66 and trimming resistors 68 and 70 are provided to allow the frequency detection IC circuit 34 to be tuned to the dial tone frequency utilized at the telepone central office 14, which is typically 350 hertz.

The values and identifications of all of the circuit components of the circuit elements of the line release network 10 are set forth in Table 1 at the and of the description of the embodiments herein.

The IC timing chip 36 is set to receive the actuating signal from line 26 on its input pin 8 on line 78. The output of the timing circuit chip 36 is the enabling signal on line 30 which is connected to the gating circuit chip 32 at pin 11 thereof on line 92. The output of the gating circuit chip 38 produces an output signal on pin 8 to line 94. Darlington connected transistors 96, 98 and 100 are provided to bring up and stablize voltage to the gating circuit chip 38. Resistors 106, 128 and 132 and a capacitor 130 together with the transistor 100 serve to reset the network 10. Resistors 126 and 108 are connected to transistor 98 to form a dual level, constant current circuit. The output signal on line 94 from the gating circuit chip 38 is connected to the base of a positive voltage switching transistor 110, which when actuated, opens the subscriber's side of the ring lead 20. Current limiting resistor 104, resistor 114 and diode 112 complete the voltage switching circuit.

Circuit resetting transistor 120 is provided to sense a momentary "on-hook" condition. When such a condition occurs, there is a voltage rise. The transistor 120 responds to this voltage rise to deactuate the gating circuit IC chip 38. The dual level constant current source transistors 122, 124 and 96 sense a customer "off-hook" condition and initiate the operation of the frequency detection IC chip 34.

Dual level constant current source transistor 98 and circuit resetting transistor 100 are provided to prevent an incoming call to the subscriber line 16 from cutting through. The transistors 98 and 100 serve as a blocking means actuated by the termination of the enabling signal on line 30 to block incoming calls from being connected to the subscriber line 16.

Other circuit elements in the line release network 10 include pull up resistors 84, 86 and 88 connected to an inverting transistor 140. Timing resistors 80 and 82 and a timing capacitor 83 are connected to pin 6 of the timing circuit chip 36. Isolation diodes 76, 142 and 144 are also provided. Diode 144 and transistor 149 serve as a voltage clamp. Resistors 134 and 136 and capacitor 138 provide a filtered voltage dividing circuit.

The line release network 10 is physically quite small, so that it is easily connected in circuit to the tip and ring leads 18 and 20 of the subscriber line 16. The line release network 10 is only about two and three-quarter inches in length, one and seven-eighth inches in width and three-quarter inches in height. It weighs only about 2.2 ounces and has three connecting leads indicated, at 22, 23 and 25 in FIG. 1.

The line release network 10 can operate on between 15 and 130 volts d.c. In the idle state it draws only about 3.4 milliamperes from the central office subscriber line power supply across the subscriber line terminal connections. It is protected against reverse polarity and includes a 130 volt RHS clamp and is self-limiting to 30 milliamperes maximum. The network 10 exhibits an impedance of 15,300 ohms when idle and 13,333 ohms when active. It exhibits a power loss of approximately 3 DB.

The line release network 10 will detect a 9 volt change as an "on-hook" condition from an "off-hook" condition, and the reverse. The total loop length at 50 volts is 4,000 ohms. The circuit immediately resets with a hook-switch flash. It operates with both analog and electronic subscriber handsets.

The line release network 10 may be connected at any location in the subscriber's line circuit 16, as for example at a modular jack, a station protector, a building terminal at a vertical main distributing frame, a horizontal main distributing frame, at line equipment, or anyplace else in the subscriber's loop.

Figure 3:
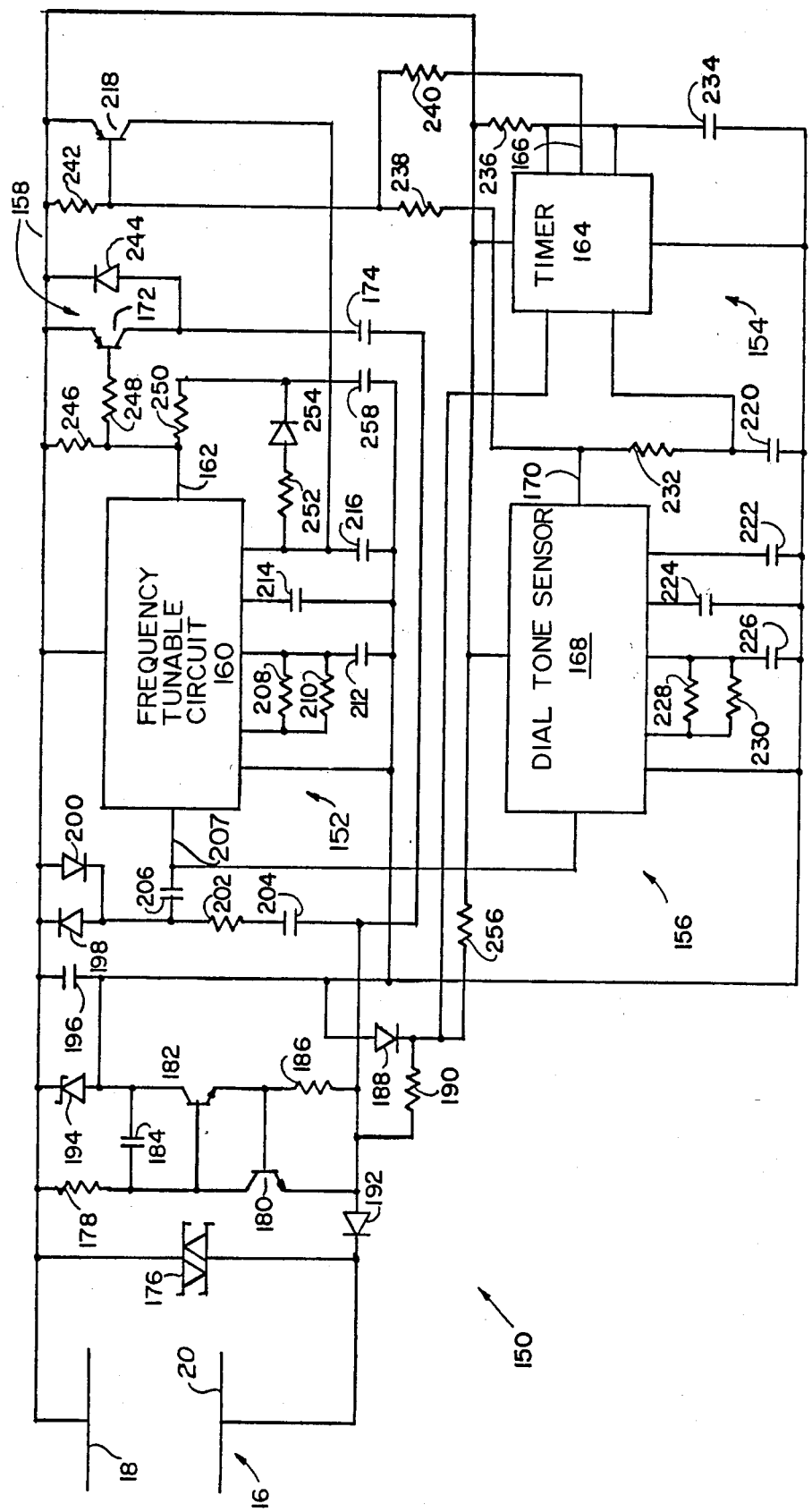
FIG. 3 is schematic diagram of a tone trap circuit according to the invention.

FIG. 3 illustrates a tone trap circuit 150 according to the invention. The tone trap circuit 150 is an electronic circuit for connection in parallel across the tip and ring leads 18 and 20 of a telephone subscriber line 16 for trapping selected tones therefrom. Like the line release network 10, the electronic tone trap circuit 150 is operated by central office subscriber line power and draws only about 3.4 milliamperes when in an idle state, and only about 3.9 milliamperes when in an active state.

The electronic tone trap circuit 150 is comprised of dial tone sensing circuitry, indicated generally at 156, a timer circuit indiated generally at 154, an alternating current tone sensitive circuit indicated generally at 152, and gating means or circuitry indicated generally at 158.

The dial tone sensing circuitry 156 includes a tone sensing XRL567 IC frequency tunable chip 168 which is coupled across the tip and ring leads 18 and 20 of the subscriber line 16, as illustrated. The dial tone sensing IC chip 168 senses the commencement of dial tone on the tip and ring leads 18 and 20, and in response thereto, provides a timer initiating or actuating signal as an output at pin 8 on line 170. The timer circuit includes an XRL555 IC timer chip 164 which is connected to the dial tone sensing circuitry 156 for producing an enabling signal as an output on line 166 at its pin 3 output. The enabling signal on line 166 is of a fixed duration, preferably 15 seconds.

The alternating current tone sensitive circuit 152 includes another XRL567 IC frequency tunable chip 160. The frequency sensitive chip 160 is tuned to detect the presence of a tone of about 770 hertz on the tip and ring leads 18 and 20, when actuated by the enabling signal from the timer chip 164. The output of the frequency detection IC chip 160 is an output signal at pin 8 on line 162. The output on line 162 is responsive to the predetermined tone frequency of 770 hertz that is produced on the ring lead 20 by depression of selected numbers on a telephone handset push-button pad. Specifically, the central horizontal rows of numbers "4", "5", and "6" of a conventional telephone handset all produce an output frequency of 770 hertz. The output signal on line 162 is fed to the gating circuitry 158. Specifically, the output on line 162 is connected to the transistor 172 which produces an alternating current short across the tip and ring leads 18 and 20 through the capacitor 174.

All of the values and identifications of the circuit elements of the tone trap circuit 150 are set forth in Table 2 herein at the end of the description of the embodiments.

The tone trap circuit 150 includes a transient suppressor 176 which will suppress transient voltage spikes of up to 1,000 volts. The network comprised of the resistors 178 and 186 and the transistors 180 and 182, drop the central office current from a voltage of between 48 and 52 volts to the 5 volts d.c. constant current supply needed to operate the IC chip 160. Capacitors 184 and 196 serve as input filters. The coupling diode 188 provides protection against connection of the system with reverse polarity. The zener diode 194 sets the input voltage at 5.1 volts, d.c., and protects the tone trap circuit 150 against incoming ringing current voltage peaks. The diodes 198 and 200 provide a voltage clamp.

A 5.1 volt d.c. differential exists across the resistor 202 and the input filtering capacitor 204 to provide the necessary nominal 5 volt d.c. power supply to pin 3 of the dial tone sensing IC chip 168 through the input filtering capacitor 206. The resistors 208 and 210 and the timing capacitor 212, the input filtering capacitor 214 and the output filtering capacitor 216 are selected to tune the frequency sensitive IC chip 160 to the desired dial tone frequency of 770 hertz.

The transistor 218 functions as a phase lock loop to stabilize the frequency of 770 HZ to the frequency sensitive chip 160. (A pullup resistor 242 is connected to the base of transistor 218—to reset IC 160 after 15 seconds.)

The frequency sensitive IC chip 160 is the same as the frequency sensitive chip 168 except that it is tuned to the selected frequency of 770 hertz associated with the numbers "4", "5", and "6" on a conventional telephone subscriber handset touch-tone push-button pad. The frequency sensitive chip 168 has timing capacitors 220 and 226 an output filtering capacitor 222, an input filtering capacitor 224, and trimming resistors 228 and 230 which serve to tune the chip 168 to the frequency of 350 hertz.

The diode 192 serves as a polarity guard while the diode 244 serves as a voltage clamp. The resistors 190 and 256 form a voltage divider. A timing resistor 246 and a current limiting resistor 248 are connected to the base of the alternating current clamping transistor 172. Current limiting resistors 250 and 252 and the diode 254 form a latch feedback circuit to the 770 HZ sensing IC chip 160. Timing resistor 236 and timing capacitors 220 and 234 are connected to the IC timer chip 164. Coupling resistors 238 and 240 are also connected to the timer chip 164, as illustrated in FIG. 3.

A tone trap circuit 150 is only placed upon a subscriber line 16 which is not authorized to utilize touch-tone equipment. If a touch-tone operated handset is employed on the subscriber line 16, an "off hook" condition will produce a dial tone of 350 hertz which is transmitted as an a.c. input, along with the power input, to pin 3 on line 207 of the frequency sensitive chip. The frequency sensitive chip 168 detects the 350 hertz dial tone signal and produces an actuating signal output on line 170. The timing circuit chip 164 receives the actuating signal output from line 170 and produces an enabling signal on line 166 for the predetermined duration of 15 seconds. The tone sensitive circuit 152 then operates when enabled by the enabling signal from the timer chip 164 and responds to the predetermined tone of 770 hertz, if such a tone is received on the subscriber line 16 by activation of the push buttons "4", "5", or "6" on a telephone touch-tone handset.

Upon receiving a 770 hertz signal, the IC chip 160 produces a gating signal on line 162 to the transistor 172. The transistor 172 responds to the gating signal to produce an alternating current short circuit across the tip and ring leads 18 and 20 through the capacitor 174.

The frequency of 770 hertz is selected as the frequency for trapping because this frequency does not appear in any common emergency number. That is, the subscriber can use the unauthorized touch tone equipment to place emergency calls, such as the emergency number "911" and a call to a telephone operator by pressing the "0" button. However, there is very little liklihood that the subscriber can utilize the unauthorized touch tone equipment for ringing up more than a few numbers, since a typical seven digit number sequence which is necessary to access a local number will in all liklihood contain at least one of the digits "4", "5", or "6".

The tone trap circuit 150 traps dual tone multifrequency tones tones during the dialing interval, but passes d.c. pulsing which is employed by rotary dial type telephones. The tone trap circuit 150 is a small, portable unit and is used to limit dual tone multifrequency tones dialing on an individual subscriber line basis.

Because of its small size, the tone trap circuit 150 may be easily employed in a telephone central office in connection with any desired subscriber line. The tone trap circuit 150 is 2¾" long 1⅛" wide and ¾" high. It weighs only one ounce. The maximum power drain from the tone trap circuit 150 is only about 4 milliamperes.

The dual tone multifrequency tones tones are disabled only during the dialing interval, that is the 15 second interval established by the timer circuit 154. Once that interval has passed, all tones, including the 770 hertz tones associated with push button numbers "4", "5", and "6" are passed. Accordingly, customers are able to use peripheral equipment interfaced with telephone equipment which employs such tones once the called number has been reached. Digital information can be transmitted using ATMF tones once the called party has been reached.

Undoubtedly, numerous variations and modifications of the invention will become readily apparent to those familiar with telephone subscriber and central office equipment. Accordingly, the scope of the invention should not be construed as limited to the specific embodiments of the invention depicted and described, but rather as defined in the claims appended hereto.

TABLE 1

| Resistors (values in ohms) | |
|---|---|
| 50 | 200 |
| 48,72,84,136,126,132 | 200K |
| 56 | 20K |
| 74 | 100K |
| 86,88 | 47K |
| 134 | 15K |
| 128 | 120K |
| 102,106 | 10K |
| 104 | 1K |
| Capacitors (values in microfarads) | |
| 54 | .47 |
| 145 | 47 |
| 147,62,64,138,130 | .1 |
| 66 | 1 |
| 83 | 10 |
| Diodes | |
| 42,116,118 | −IN646 |
| 52 | −IN4625 |
| 58,60,76,144,90,142,112 | −IN914 |
| Transistors | |
| 44 | −2N4402 |
| 46,120,110 | −2N6520 |
| 144,140,96,98,100 | −2N4400 |
| 122,124 | −2N6517 |

TABLE 2

| Resistors (values in ohms) | |
|---|---|
| 178,246,238,240 | 47K |
| 186 | 150 |
| 190 | 120K |
| 248 | 10K |
| 250,242,252 | 20K |
| 232 | 200K |
| 236 | 1.2M |
| 256 | 9.1K |
| Capacitors (values in microfarads) | |

TABLE 2-continued

| | |
|---|---|
| 184,206,212,174,214,258 | .1 |
| 196,204 | .47 |
| 216,226 | .22 |
| 174,234 | 10 |
| 220,222,224 | 1 |
| Diodes | |
| 194 | −IN4689 |
| 196,198,188,254 | −IN914 |
| 192,244 | −IN646 |
| Transistors | |
| 180 | −2N4400 |
| 182 | −2N6517 |
| 172 | −2N6520 |
| 218 | −2N4402 |

We claim:

1. A tone trap circuit for connection across the tip and ring leads of a telephone subscriber line in a telephone central office powered by subscriber line current comprising:
   a dial tone detection circuit which produces an actuating signal output and which is connected across said tip and ring leads,
   a timing circuit which receives said actuating signal output and which produces an enabling signal responsive thereto for a predetermined duration,
   a tone sensitive circuit coupled across said tip and ring leads and which operates when enabled by said enabling signal to respond to at least one predetermined tone from a pushbutton pad on a telephone handset on said subscriber line to produce a gating signal, and
   gating means responsive to said gating signal to produce an alternating current short circuit across said tip and ring leads.

2. A tone trap circuit according to claim 1 in which said dial tone detection circuit, said timing circuit, said tone sensitive circuit and said gating means draw no more than about 3.4 milliamperes when in an idle state and no more than about 4.0 milliamperes when in an active state.

3. A tone trap circuit according to claim 1 in which said dial tone detection circuit produces said actuating signal in response to a tone of about 350 hertz, and includes a phase lock loop circuit to stabilize the frequency of dial tone thereto.

4. A tone trap circuit according to claim 1 wherein said tone sensitive circuit responds to a frequency of 770 hertz.

5. An electronic circuit for connection in parallel across the tip and ring leads of a telephone subscriber line for trapping selected tones therefrom and operated by central office subscriber line power comprising:
   dial tone sensing circuitry coupled across said tip and ring leads for sensing the commencement of dial tone thereon and for providing a timer initiating signal responsive thereto,
   a timer circuit connected to said dial tone sensing circuitry for producing an enabling signal for a fixed duration,
   an alternating current tone sensitive circuit connected to said timer circuit and to said ring lead and responsive to said enabling signal and tuned to produce an output signal responsive to a predetermined tone frequency produced on said ring lead by selected numbers on a telephone handset pushbutton pad, and gating means actuated by said output signal from said tone sensitive circuit to produce an alternating current short across said tip and ring leads.

6. An electronic circuit according to claim 5 wherein said tone sensitive circuit produces said output signal upon detecting the presence of a tone of about 770 hertz on said tip and ring leads.

7. An electronic circuit according to claim 5 which draws no more than about 4 milliamperes of current from said central office subscriber line power.

8. A line release network for connection to the tip lead and for connection in circuit with the ring lead of a telephone subscriber line in a telephone central office and powered by telephone subscriber line current comprising a dial tone detection circuit which responds to dial tone on said subscriber line by producing an actuating signal, a timer circuit responsive to said actuating signal to produce an enabling signal of a predetermined duration, gating means coupled to receive said enabling signal from said timer circuit and resposive thereto to drop the voltage of said telephone subscriber central line current to said ring lead of said subscriber line upon termination of said enabling signal, and disabling means coupled to said tip and ring leads and actuated by said timer to detect an interruption of dial tone and to disable said gating means responsive to an interruption of dial tone.

9. A line release network according to claim 8 wherein said gating means drops the voltage of said telephone subscriber line current on said ring lead sufficiently to release any central office channel and trunk connected thereto, and said gating means maintains sufficient voltage on said ring lead to detect an on hook condition on said subscriber line.

10. A line release network according to claim 8 further comprising blocking means actuated by termination of said enabling signal to block incoming calls from being connected to said subscriber line.

11. A line release network according to claim 8 wherein said dial tone detection circuit, said timer circuit, said gating means and said disabling means draw from said telephone subscriber line current about 3.4 milliamperes in an idle condition and no greater than about 3.9 milliamperes in an active condition.

12. An electronic circuit for releasing a channel and trunk in a telephone central office and coupled to the tip and ring leads of a telephone subscriber line and powered by central office subscriber line current and including dial tone detection means which senses the commencement of dial tone on said subscriber line and produces an actuating signal responsive thereto, and which senses an interruption of dial tone and produces a disabling signal responsive thereto, timer means responsive to said actuating signal to produce a gate enabling signal, gating means responsive to the termination of said gating signal to open at least one of said tip and said ring leads, and said gating means is disabled by said disabling signal.

13. An electronic circuit according to claim 12 in which said tone detection means responds to cessation of dial tone and to tones produced by a telephone handset keypad as dial tone interruption and produces said disabling signal responsive thereto.

14. An electronic circuit according to claim 12 which draws no more than about 4.0 milliamperes from said central office subscriber line current.

* * * * *